United States Patent
Miura

(10) Patent No.: US 8,800,961 B2
(45) Date of Patent: Aug. 12, 2014

(54) FLUID CONTROL ELECTROMAGNETIC VALVE

(75) Inventor: Yuichiro Miura, Obu (JP)

(73) Assignee: Denso Corporation, Kariya (JP)

( * ) Notice: Subject to any disclaimer, the term of this patent is extended or adjusted under 35 U.S.C. 154(b) by 164 days.

(21) Appl. No.: 13/591,390

(22) Filed: Aug. 22, 2012

(65) Prior Publication Data

US 2013/0048890 A1    Feb. 28, 2013

(30) Foreign Application Priority Data

Aug. 29, 2011    (JP) .................. 2011-186333

(51) Int. Cl.
*F16K 31/02*    (2006.01)
(52) U.S. Cl.
USPC ....... 251/129.15; 251/361; 251/362; 251/363
(58) Field of Classification Search
USPC ........ 251/129.15, 129.17, 360–363; 123/519, 123/520
See application file for complete search history.

(56) References Cited

U.S. PATENT DOCUMENTS

| | | | | |
|---|---|---|---|---|
| 3,429,552 A * | 2/1969 | Erickson et al. | ......... | 251/129.17 |
| 3,480,040 A * | 11/1969 | Erickson | .................. | 251/129.15 |
| 4,239,685 A | 12/1980 | Pigasse | | |
| 4,628,887 A * | 12/1986 | Mitchell et al. | ............... | 123/520 |
| 4,711,269 A * | 12/1987 | Sule | ......................... | 251/129.17 |
| 4,826,132 A * | 5/1989 | Moldenhauer | .......... | 251/129.17 |
| 4,830,332 A * | 5/1989 | Miura et al. | ............ | 251/129.15 |
| 4,913,399 A * | 4/1990 | Migliori | .................. | 251/129.15 |
| 5,546,987 A * | 8/1996 | Sule | ......................... | 251/129.17 |
| 6,488,050 B1* | 12/2002 | Jabcon | ..................... | 251/129.17 |
| 7,549,207 B2* | 6/2009 | Tsuge et al. | .................. | 123/520 |
| 2006/0117553 A1 | 6/2006 | Tsuge et al. | | |
| 2013/0008537 A1* | 1/2013 | Onodera et al. | ........... | 137/614.2 |

FOREIGN PATENT DOCUMENTS

| | | |
|---|---|---|
| JP | 54-126231 | 10/1979 |
| JP | 58-002470 | 1/1983 |
| JP | 2006-153231 | 6/2006 |
| JP | B2-4045209 | 2/2008 |

* cited by examiner

*Primary Examiner* — Eric Keasel
(74) *Attorney, Agent, or Firm* — Nixon & Vanderhye P.C.

(57) ABSTRACT

A fluid control electromagnetic valve includes a fixed core, a movable valving element, a resin body, a valve seat member, a first sealing member, and a second sealing member. The valve seat member is formed from a material having a smaller linear expansion coefficient than the resin body. The first sealing member is accommodated in the resin body in an elastic compression state to seal a fluid passage and is positioned around the fixed core. The second sealing member is accommodated in the resin body in an elastic compression state to seal the fluid passage. The valve seat member is clamped between the second sealing member and the first sealing member in an axial direction. Elastic restoring force applied by the second sealing member to the valve seat member is larger than elastic restoring force applied by the first sealing member to the valve seat member.

6 Claims, 11 Drawing Sheets

FLUID CONTROL ELECTROMAGNETIC VALVE

CROSS REFERENCE TO RELATED APPLICATION

This application is based on Japanese Patent Application No. 2011-186333 filed on Aug. 29, 2011, the disclosure of which is incorporated herein by reference.

TECHNICAL FIELD

The present disclosure relates to a fluid control electromagnetic valve which controls a flow of fluid.

BACKGROUND

Conventionally, a fluid control electromagnetic valve is known. In the valve, a fixed core and a movable valving element are accommodated in a resin body that defines a flow passage through which fluid flows. In this kind of fluid control electromagnetic valve, the movable valving element is reciprocated in the axial direction between an initial position and attraction position as described in, for example, JP-A-2006-153231 corresponding to US2006/0117553A1.

Specifically, the movable valving element is attracted from the initial position into the attraction position as a result of generation of electromagnetic attraction force applied to a movable core of the valving element by the fixed core. Accordingly, the movable valving element is disengaged from a fixed valve seat which is formed from the resin body so as to open a fluid passage. On the other hand, the movable valving element returns to the initial position from the attraction position due to disappearance of the electromagnetic attraction force to be engaged with the fixed valve seat. Consequently, the movable valving element closes the fluid passage. As a result of the opening and closing operations of the fluid passage using such electromagnetic actuation of the movable valving element, a flow of fluid through the fluid passage can be accurately controlled. Particularly, in the structure of JP-A-2006-153231 in which the fluid passage is connected between a fuel tank which stores fuel, and a canister that adsorbs fuel vapor formed as a result of evaporation of fuel inside the tank, control accuracy of a flow of mixture of the fuel vapor and air from the fuel tank toward the canister can be ensured.

It is described in JP-A-2006-153231 that the resin body which accommodates the fixed core and the movable valving element, and the resin body which is formed into the fixed valve seat are formed from the same polybutylene terephthalate and are fixed by caulking to each other. In this case, the polybutylene terephthalate is a resin having a larger linear expansion coefficient than a metal from which the fixed core and the movable core are formed. Therefore, particularly in an environment around an engine as in JP-A-2006-153231, each resin body is subject to heat and easily expanded.

The attraction position among movement positions of the movable valving element is determined depending on a position of the metal fixed core, which attracts the metal movable core, whereas the initial position of the movable valving element is determined according to a position of the fixed valve seat with which the movable valving element is engaged. Accordingly, when the fixed valve seat is disengaged from the fixed core by the thermal expansion of each resin body as described above, the initial position is also separated from the attraction position. As a result, a flow rate of fluid flowing through a clearance between the movable valving element at the attraction position and the fixed valve seat varies in the fluid passage. Thus, accuracy in control of a flow of fluid through the fluid passage may be deteriorated.

SUMMARY

According to the present disclosure, there is provided a fluid control electromagnetic valve for controlling a flow of fluid, including a fixed core, a movable valving element, a resin body, a valve seat member, a first sealing member, and a second sealing member. The fixed core is formed from metal and is configured to generate electromagnetic attraction force. The movable valving element includes a movable core formed from metal. The movable valving element is attracted from an initial position to an attraction position as a result of application of the electromagnetic attraction force to the movable core and is returned from the attraction position to the initial position as a result of disappearance of the electromagnetic attraction force, so that the movable valving element reciprocates in its axial direction between the initial position and the attraction position. The resin body accommodates therein the fixed core and the movable valving element and includes therein a fluid passage through which fluid flows. The valve seat member is formed from a material having a smaller linear expansion coefficient than the resin body and is accommodated in the resin body. The valve seat member includes a fixed valve seat, and the movable valving element is engaged with or disengaged from the fixed valve seat. The fluid passage is opened as a result of the disengagement of the movable valving element at the attraction position from the fixed valve seat and the fluid passage is closed as a result of the engagement of the movable valving element at the initial position with the fixed valve seat. The first sealing member is accommodated in the resin body in an elastic compression state to seal the fluid passage and is positioned around the fixed core. The second sealing member is accommodated in the resin body in an elastic compression state to seal the fluid passage. The valve seat member is clamped between the second sealing member and the first sealing member in the axial direction. Elastic restoring force applied by the second sealing member to the valve seat member is larger than elastic restoring force applied by the first sealing member to the valve seat member.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments will be described below with reference to the accompanying drawings. By using the same numerals to indicate corresponding components in the embodiments, repeated explanations may be omitted. In each embodiment, when only a part of a configuration is described, configuration(s) in the previously described other embodiment(s) can be applied to the other parts of the configuration. In addition to a combination of configurations indicated in the description in each embodiment, although not indicated, configurations in more than one embodiment are partly combinable unless the combination particularly interferes with each other.

(First Embodiment)

Figure 1:
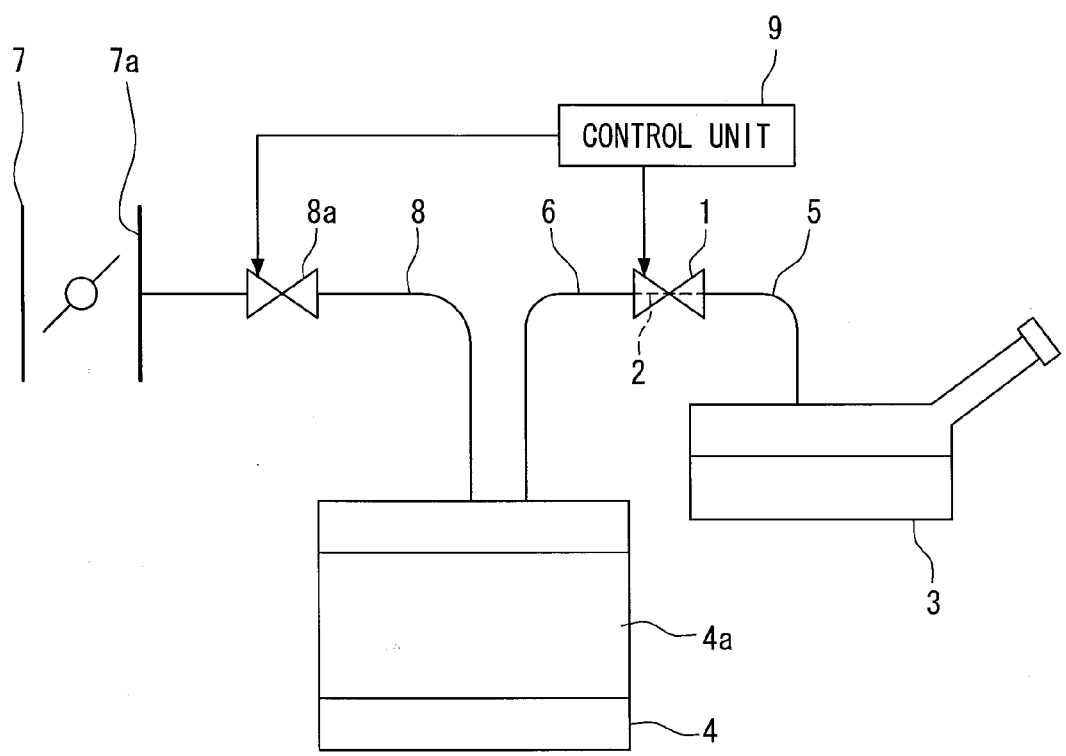
FIG. 1 is a schematic diagram roughly illustrating a system to which a fluid control electromagnetic valve in accordance with a first embodiment is applied.

FIG. 1 illustrates an application of a fluid control electromagnetic valve 1 according to a first embodiment to a system which processes fuel vapor. A fluid passage 2 formed in the fluid control electromagnetic valve 1 communicates with a tank passage 5 and a canister passage 6 extending respectively from a fuel tank 3 and a canister 4 in a vehicle. The fuel tank 3 stores volatile fuel such as gasoline fuel supplied to an internal combustion engine 7 of the vehicle. In the fuel tank 3, fuel vapor is generated as a result of evaporation of the stored fuel, and the fuel vapor is mixed with air. A fuel-air mixture obtained by mixing the fuel vapor and air flows from the fuel tank 3 into the tank passage 5 to reach the inside of the canister 4 through the fluid passage 2 and the canister passage 6 at the time of opening of the fluid control electromagnetic valve 1. The canister 4 accommodates an adsorbent 4a to be capable of adsorbing the fuel vapor in the fuel-air mixture which has reached the inside of the canister 4. In addition, the canister 4 communicates with a purge passage 8 that opens into an intake passage 7a of the engine 7 in the vehicle. Accordingly, at the time of opening of a purge valve 8a along the purge passage 8, a negative pressure generated in the intake passage 7a is applied to the inside of the canister 4, so that the fuel vapor is separated from the adsorbent 4a to be purged away into the intake passage 7a.

Figure 3:
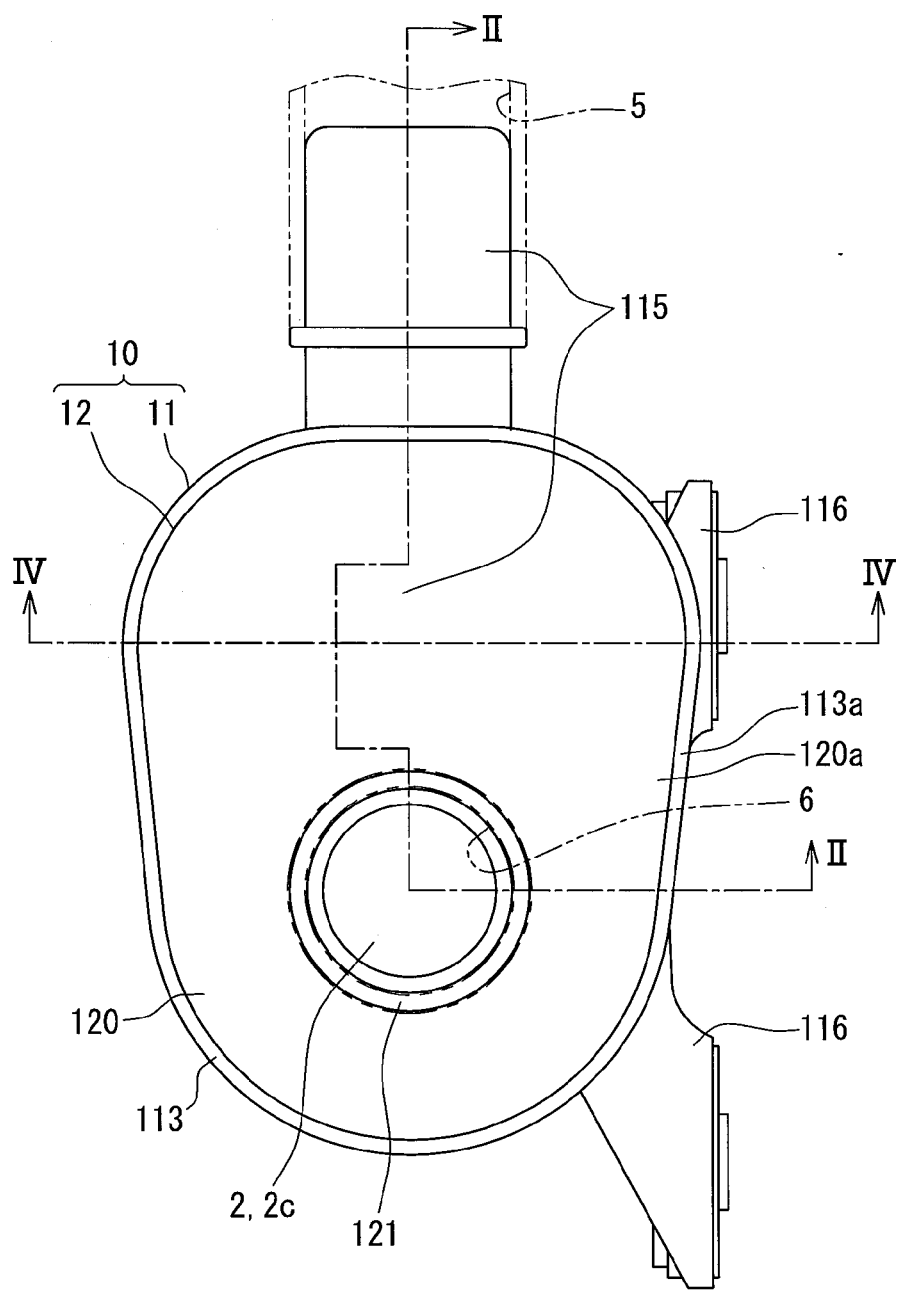
FIG. 3 is a side view illustrating the fluid control electromagnetic valve of the first embodiment.
Figure 4:
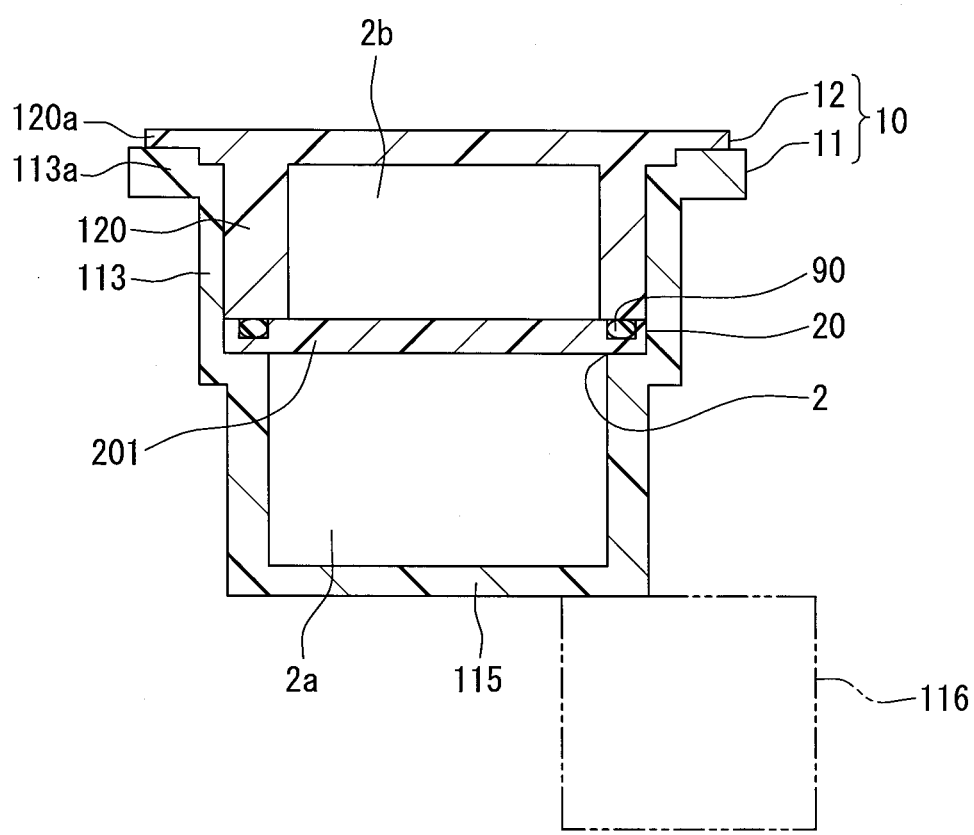
FIG. 4 is a cross-sectional view taken along a line IV-IV in FIG. 3, illustrating the fluid control electromagnetic valve of the first embodiment.

A specific configuration of the fluid control electromagnetic valve 1 will be described below. The fluid control electromagnetic valve 1, which controls a flow of the fuel-air mixture from the fuel tank 3 toward the canister 4, includes, as illustrated in FIGS. 2 to 4, a resin body 10, a valve seat member 20, a fixed core 30, a movable valving element 40, a valve spring 50, a solenoid coil 60, and a terminal 70.

The resin body 10 is obtained by combining together a resin housing 11 and a resin cover 12, and has a hollow shape as a whole. The resin housing 11 and the resin cover 12 are formed from, for example, resin of polyamide 66 (PA66) or polybutylene terephthalate (PBT) having a relatively high linear expansion coefficient. Particularly, in the present embodiment, the resin housing 11 is formed from a resin that is colored so as to have absorptivity for a laser, and the resin cover 12 is formed from a resin of the same kind as the resin housing 11 with permeability for a laser.

The resin body 10 is formed by insert-molding whereby the components 30, 60, 70 and so forth are embedded into its forming resin, and includes first to third accommodating portions 110 to 112, a joining portion 113, a connector portion 114, an input port portion 115, and an attachment portion 116.

Figure 2:
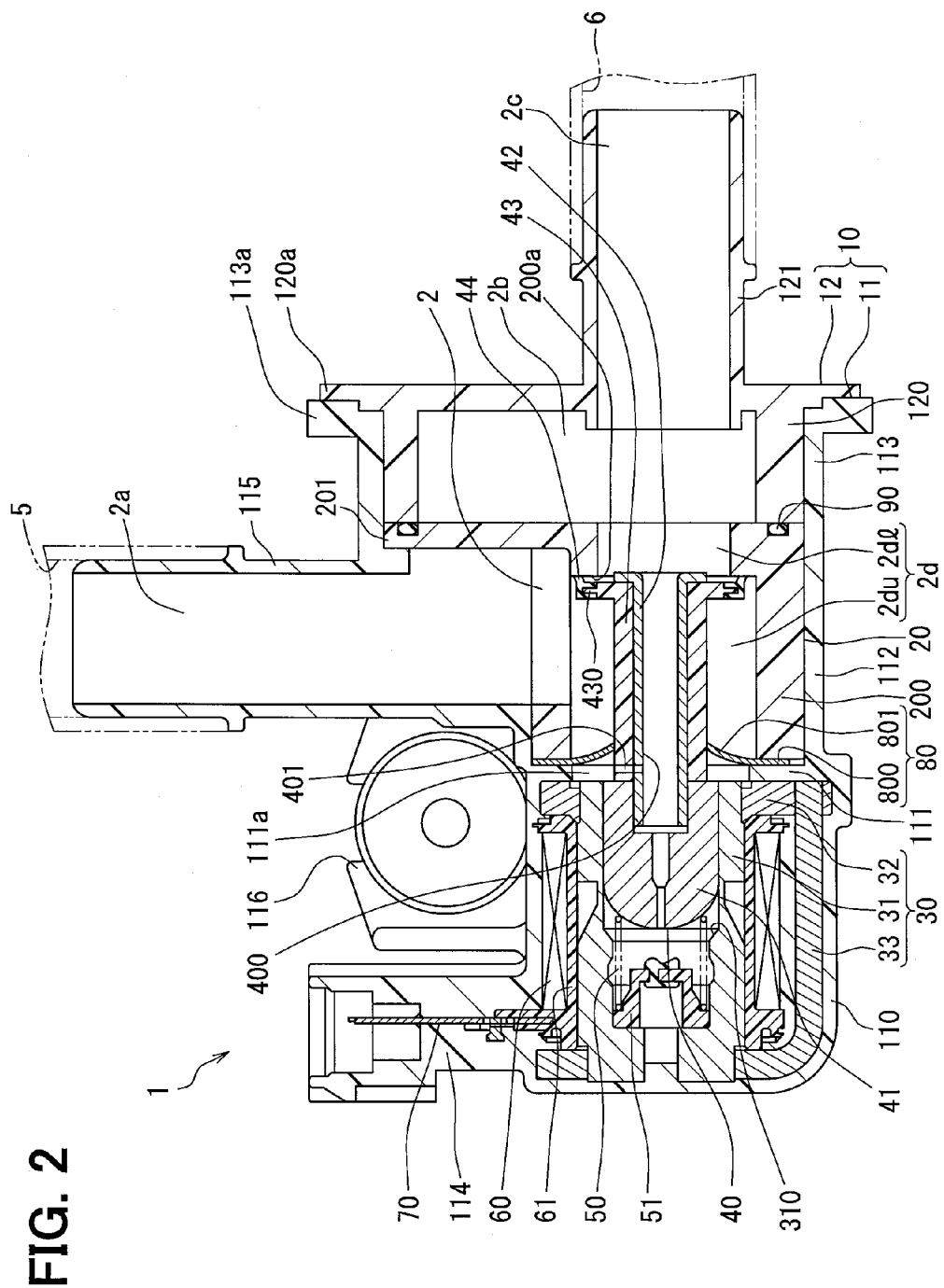
FIG. 2 is a sectional view taken along a line II-II in FIG. 3, illustrating the fluid control electromagnetic valve of the first embodiment.

The cylindrical first accommodating portion 110 illustrated in FIG. 2 accommodates the fixed core 30 and the solenoid coil 60 in their fixed state, and accommodates a part of the movable valving element 40 and the valve spring 50 in their movable state. The annular plate-like second accommodating portion 111 is located coaxially adjacent to the first accommodating portion 110, and includes a fluid chamber 111a, which accommodates a part of the movable valving element 40 in its movable state, in the portion 111. In the present embodiment, thickness of the second accommodating portion 111 in the axial direction is set at such a thickness that thermal expansion of the portion 111 in the axial direction is substantially negligibly-small despite a relatively high linear expansion coefficient of the portion 111. The cylindrical third accommodating portion 112 is located coaxially adjacent to the second accommodating portion 111 on the opposite side of the portion 111 from the first accommodating portion 110 in the axial direction. The portion 112 respectively accommodates the valve seat member 20 in its fixed state and a part of the movable valving element 40 in its movable state. The joining portion 113 having a generally trapezoidal cylindrical shape (see also FIG. 3) is located eccentrically adjacent to the third accommodating portion 112 on the opposite side of the portion 112 from the second accommodating portion 111 in the axial direction.

The connector portion 114 is formed in a cylindrical shape having a bottom that projects radially outward from the first accommodating portion 110, and accommodates the terminal 70 in its fixed state. As illustrated in FIGS. 2 to 4, the input port portion 115 is formed in a cylindrical shape that projects radially outward from the third accommodating portion 112, and includes an input passage 2a of the fluid passage 2, which communicates with the tank passage 5, in the portion 115. The attachment portion 116 is attached to, for example, an upper wall portion of the fuel tank 3 via a bolt (not shown).

The resin cover 12, which constitutes the resin body 10 together with the resin housing 11 having such a configuration, includes an insertion portion 120 and an output port portion 121. The insertion portion 120 having a generally trapezoidal cylindrical shape is coaxially fitted into an inner peripheral surface of the joining portion 113, and includes a communication passage 2b of the fluid passage 2 in the portion 120. In the present embodiment, the insertion portion 120 and the joining portion 113 respectively have annular plate-like joining flanges 120a, 113a, and the whole regions of these flanges 120a, 113a in their circumferential direction are joined together by laser-welding. As illustrated in FIGS. 2 and 3, the output port portion 121 is formed in a cylindrical shape that projects from the insertion portion 120 on the opposite side from the joining portion 113 in the axial direction, and includes the communication passage 2b of the fluid passage 2 and an output passage 2c of the fluid passage 2 that communicates with the canister passage 6, in the portion 121.

As illustrated in FIGS. 2 and 4, the valve seat member 20 is formed in a hollow shape as a whole from resin such as polyphenylene sulfide (PPS) having a smaller linear expansion coefficient than the components 11, 12 of the resin body 10. The valve seat member 20 has a fourth accommodating portion 200 and a partition portion 201.

As illustrated in FIG. 2, the cylindrical fourth accommodating portion 200 is disposed at a position between the second accommodating portion 111 and the insertion portion 120 in the axial direction, and is coaxially fitted and fixed on an inner peripheral surface of the third accommodating portion 112. The fourth accommodating portion 200 includes a valve passage 2d of the fluid passage 2 that accommodates a part of the movable valving element 40 in its movable state in the portion 200. The valve passage 2d communicates between the input passage 2a and the communication passage 2b. The fourth accommodating portion 200 includes a fixed valve seat 200a, and the fixed valve seat 200a, which is exposed to a halfway portion of the valve passage 2d, is formed in an annular belt surface shape coaxial with the accommodating portions 110 to 112 and the output port portion 121. As illustrated in FIGS. 2 and 4, the partition portion 201 is formed in a flat plate shape that projects radially outward from the fourth accommodating portion 200. The partition portion 201 divides the input passage 2a from the communication passage 2b and divides the valve passage 2d (specifically, a passage portion 2du described hereinafter) from the communication passage 2b.

As illustrated in FIG. 2, the fixed core 30 is obtained as a result of combination of a plate core 32 and a yoke core 33 with a core main body 31. The core main body 31, the plate core 32, and the yoke core 33 are formed from magnetic metals which have smaller linear expansion coefficients than the components 11, 12 of the resin body 10 and which are the same as or different from each other.

The cylindrical core main body 31 is disposed inside the first accommodating portion 110 coaxially with the portion 110. The core main body 31 includes an attracting part 310 for electromagnetically attracting the movable valving element 40 at its intermediate part in the axial direction. The annular plate-like plate core 32 is coaxially fitted on an outer peripheral surface of one end part of the core main body 31 in its axial direction, so that the plate core 32 is connected magnetically to the core main body 31. The L-shaped plate-like yoke core 33 is coaxially fitted on an outer peripheral surface of the other end portion of the core main body 31 in its axial direction, and passes and is fitted through the plate core 32 in the axial direction. The yoke core 33 is thereby connected magnetically to these core main body 31 and the plate core 32.

Figure 5:
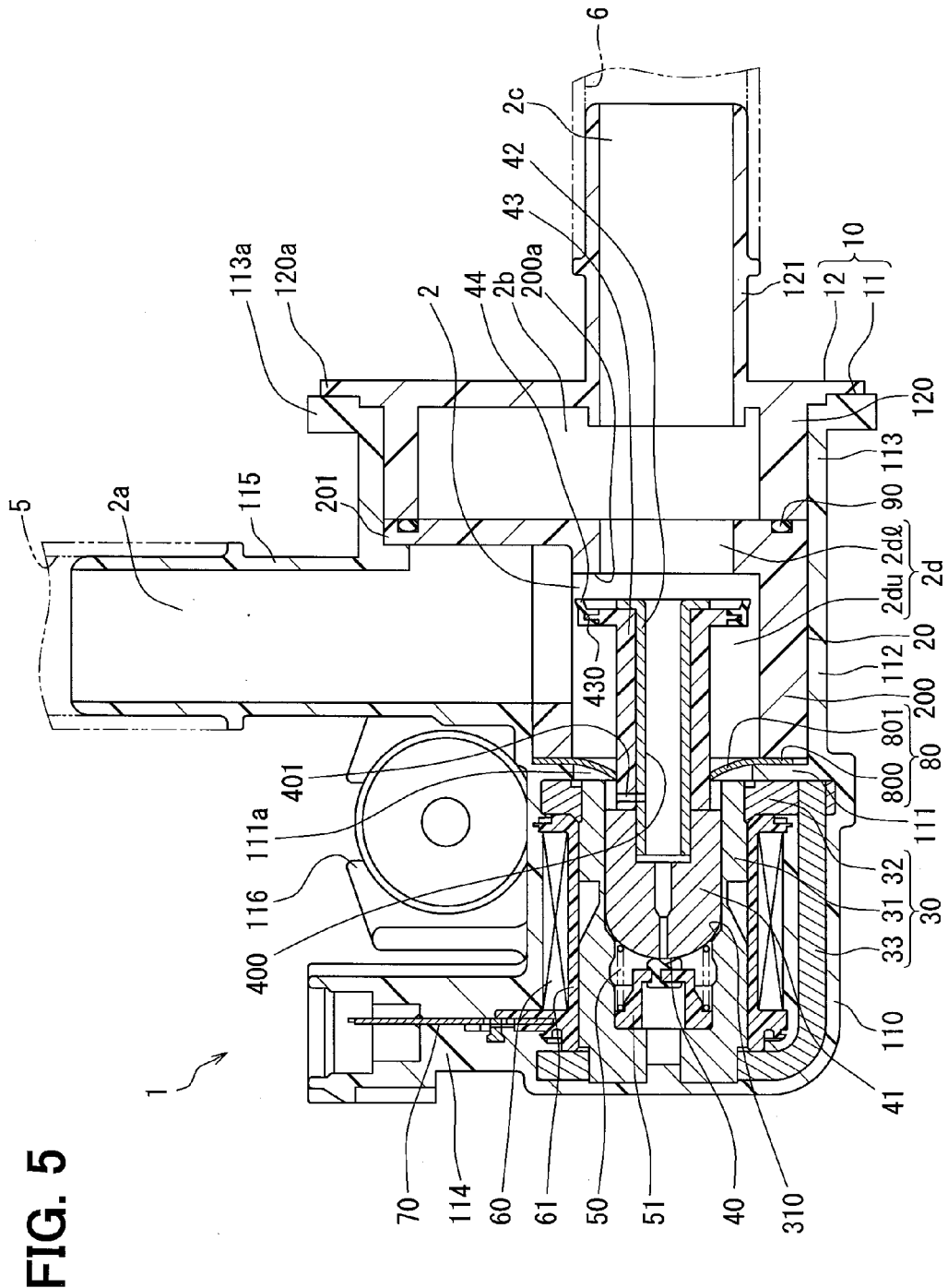
FIG. 5 is a sectional view illustrating the fluid control electromagnetic valve of the first embodiment in its operating state which is different from FIG. 2.

The movable valving element 40 is obtained by combination of a valve member 43 and a buffer member 44 with a movable core 41 and a shaft member 42. As in FIGS. 2 and 5, the movable valving element 40 is disposed such that the entire element 40 straddles the first to third accommodating portions 110 to 112 at any movement position. FIG. 2 illustrates the initial position of the movable valving element 40, and FIG. 5 illustrates an attraction position of the movable valving element 40.

The cylindrical movable core 41 is formed from magnetic metal, and disposed inside the core main body 31 coaxially with the main body 31, and can slidably reciprocate in the axial direction on an inner peripheral surface of the core main body 31. As a result of the generation of electromagnetic attraction force between the movable core 41 and the attracting part 310, which is opposed to the movable core 41 in the axial direction, the movable core 41 is displaced from the initial position in FIG. 2 to the attraction position in FIG. 5 along with the other components 42 to 44 of the movable valving element 40. On the other hand, as a result of disappearance of the electromagnetic attraction force between the movable core 41 and the attracting part 310, the movable core 41 is displaced from the attraction position in FIG. 5 to the initial position in FIG. 2 along with the other components 42 to 44 of the movable valving element 40.

The cylindrical shaft member 42 is formed from metal having a smaller linear expansion coefficient than the components 11, 12 of the resin body 10, and coaxially fitted and fixed on an inner peripheral surface of the movable core 41, so that the shaft member 42 projects further on the opposite side from the attracting part 310 in the axial direction than the movable core 41. The cylindrical valve member 43 is formed from, for example, polyphenylene sulfide (PPS) which is a resin having a smaller linear expansion coefficient than the components 11, 12 of the resin body 10, to have a shorter axial length than the shaft member 42. The valve member 43 is coaxially fitted and fixed on an outer peripheral surface of a portion of the shaft member 42 exposed from the movable core 41. An annular plate-like holding flange 430, which is opposed to the fixed valve seat 200a in the axial direction, is formed integrally with an end portion of the valve member 43 on its opposite side from the movable core 41 in the axial direction.

The buffer member 44 is formed from rubber into a cylindrical shape extending with a C-shaped (horseshoe-shaped) cross-section. The buffer member 44 is coaxially held by the valve member 43 in a mode to clamp the holding flange 430 from its both sides in the axial direction. At the initial position in FIG. 2, the buffer member 44 is engaged with the fixed valve seat 200a to be in a valve-closing state to close the valve passage 2d of the fluid passage 2. On the other hand, at the attraction position in FIG. 5, the buffer member 44 is disengaged from the fixed valve seat 200a to be in a valve-opening state to open the valve passage 2d of the fluid passage 2.

A longitudinal hole 400 and a lateral hole 401 are provided for the movable valving element 40 of the present embodiment. The longitudinal hole 400 is formed as an inner hole of the shaft member 42, and communicates with the valve passage 2d on its opposite side from the movable core 41 in the axial direction. The lateral hole 401 passes through the shaft member 42 and the valve member 43 by radially straddling the member 42, 43 so as to communicate with the longitudinal hole 400 and the fluid chamber 111a.

The valve spring 50 is a compression coil spring made of metal, and is disposed inside the core main body 31 coaxially with the main body 31. One end part of the valve spring 50 in its axial direction is engaged with a spring guide 51, which is fitted and fixed on an inner peripheral surface of the core main body 31. The other end part of the valve spring 50 in its axial direction is in contact with an end face of the movable core 41 in its axial direction on the attracting part 310-side. As a result of such a mode of its engagement and contact, the valve spring 50 urges the movable valving element 40 from the attraction position in FIG. 5 toward the initial position in FIG. 2.

The solenoid coil 60 having a cylindrical shape as a whole is obtained by winding a metal wire material around a resin bobbin 61, and is disposed inside the first accommodating portion 110 at a position between the core main body 31 and the yoke core 33 in the radial direction. The solenoid coil 60 is connected electrically to the metal terminal 70 which is embedded in the connector portion 114, and is energization-controlled by an external control unit 9 (see FIG. 1) through the terminal 70. The solenoid coil 60 is excited upon its energization by the control unit 9 to pass a magnetic flux through the fixed core 30 and the movable core 41. As a result, electromagnetic attraction force for magnetically attracting the movable core 41 to the attracting part 310 is generated, so that the movable valving element 40 is displaced to the attraction position in FIG. 5. On the other hand, the solenoid coil 60 is demagnetized as a result of a stop of its energization by the control unit 9 to eliminate the magnetic flux passing through the fixed core 30 and the movable core 41. As a result, electromagnetic attraction force applied between the attracting part 310 and the movable core 41 also disappears. Accordingly, the movable valving element 40, which is urged by the valve spring 50, is displaced to the initial position in FIG. 2.

As illustrated in FIGS. 2 and 4, the fluid control electromagnetic valve 1 further includes a first sealing member 80 and a second sealing member 90.

As illustrated in FIG. 2, the first sealing member 80 is formed from rubber into a thin-film annular shape, and is accommodated in the third accommodating portion 112 coaxially with the portion 112. An outer circumferential sealing portion 800 of the first sealing member 80 is clamped between the second accommodating portion 111 and the fourth accommodating portion 200 in the axial direction, so that the sealing portion 800 is positioned at a neighboring part of the plate core 32, which is adjacent to the thin-walled second accommodating portion 111 in the axial direction. In such a positioning state, the outer circumferential sealing portion 800 applies elastic restoring force on their axially repulsive side to the portions 111, 200 due to its elastic compression between the second accommodating portion 111 and the fourth accommodating portion 200. At the same time, the sealing portion 800 seals the valve passage 2d of the fluid passage 2 and the fluid chamber 111a with respect to the outside.

A portion of the first sealing member 80 radially inward of the outer circumferential sealing portion 800 has flexibility to function as a diaphragm portion 801 that divides the fluid chamber 111a from the valve passage 2d. The diaphragm portion 801 surrounds the movable valving element 40 coaxially with the element 40, and is fixed on an outer peripheral surface of the valve member 43. As a result of the above-described configuration, at the initial position in FIG. 2, a passage portion 2dl of the valve passage 2d on the communication passage 2b-side of the fixed valve seat 200a communicates with the fluid chamber 111a through the lateral hole 401 and the longitudinal hole 400. Consequently, a pressure in the fluid chamber 111a is substantially the same as a pressure in the passage portion 2dl. Thus, if a passage portion 2du of the valve passage 2d on the input passage 2a-side of the fixed valve seat 200a has a lower pressure than the passage portion 2dl, a movement of the movable valving element 40 at the initial position despite the disappearance of electromagnetic attraction force between the cores 30, 41 can be limited.

As illustrated in FIGS. 2 and 4, the second sealing member 90 is formed from rubber into a generally trapezoidal annular shape extending with an elliptical cross-section. The second sealing member 90 is accommodated in the third accommodating portion 112 with a portion of the member 90 in its circumferential direction opposed to the outer circumferential sealing portion 800 of the first sealing member 80 in the axial direction. In the axial direction, the second sealing member 90 is clamped between the fourth accommodating portion 200 and the insertion portion 120, and the fourth accommodating portion 200 is clamped between the member 90 and the outer circumferential sealing portion 800 of the first sealing member 80. As a result of such a clamping mode, due to its elastic compression between the fourth accommodating portion 200 and the insertion portion 120, the second sealing member 90 applies elastic restoring force on their axially repulsive side to the portions 200, 120. At the same time, the member 90 seals the communication passage 2b of the fluid passage 2 from the outside. In addition, at the initial position in FIG. 2, the second sealing member 90 fulfills a function of sealing a clearance between the passage portions 2dl, 2du of the valve passage 2d in collaboration with the first sealing member 80.

The second sealing member 90 of the present embodiment is formed from a rubber same as the first sealing member 80 to be thicker in the axial direction than the first sealing member 80. As a result of such a forming mode, the elastic restoring force, which is applied to one end part of the fourth accommodating portion 200 in its axial direction by the second sealing member 90, is set to be larger than the elastic restoring force, which is applied to the other end portion of the fourth accommodating portion 200 in its axial direction by the first sealing member 80.

Next, the overall operation of the fluid control electromagnetic valve 1 will be described. Upon an oil supply whereby fuel is supplied to the fuel tank 3 from the outside of the vehicle, the control unit 9 starts energization of the solenoid coil 60. Accordingly, as a result of the generation of electromagnetic attraction force between the cores 30, 41 by the excitation of the solenoid coil 60, the movable valving element 40 is displaced from the initial position in FIG. 2 toward the attraction position in FIG. 5. Consequently, the movable valving element 40 is disengaged from the fixed valve seat 200a to be in a valve-opening state, so that the valve passage 2d is opened and the passage portions 2du, 2dl of the passage 2d communicate with each other. Meanwhile, inside the fuel tank 3, the pressure increases in accordance with the oil supply, and the amount of fuel vapor generated is increased. Therefore, in a valve-opening state, a mixture of the fuel vapor and air inside the fuel tank 3 flows into the input passage 2a and the passage portion 2du on an upstream side of the fixed valve seat 200a, and is further guided into the canister 4 via the passage portion 2dl and the passages 2b, 2c on a downstream side of the fixed valve seat 200a.

On the other hand, the control unit 9 stops the energization of the solenoid coil 60 upon completion of the oil supply to the fuel tank 3. Accordingly, as a result of the disappearance of electromagnetic attraction force between the cores 30, 41 by the demagnetization of the solenoid coil 60, the movable valving element 40 is displaced from the attraction position in FIG. 5 to the initial position in FIG. 2. Consequently, the movable valving element 40 is engaged with the fixed valve seat 200a to be in a valve-closing state, so that the passage portions 2du, 2dl are disconnected to each other and the valve passage 2d is closed. Thus, in a valve-closing state, a flow of the fuel-air mixture from the inside of the fuel tank 3 into the canister 4 is inhibited.

Operation and its effects of the above-described fluid control electromagnetic valve 1 will be explained below. Among the displacement positions of the movable valving element 40 in the fluid control electromagnetic valve 1, the attraction position in FIG. 5 is determined in accordance with a position of the metal fixed core 30 which attracts the metal movable core 41, whereas the initial position in FIG. 2 is determined depending on a position of the fixed valve seat 200a with which the movable valving element 40 is engaged. Accordingly, in order to secure accuracy in control of a flow of fluid through the passage 2 by means of the opening and closing operations of the fluid passage 2 using the electromagnetic actuation of the movable valving element 40, it is important to stabilize a relative position of the fixed valve seat 200a with respect to the fixed core 30 to maintain a separation distance (clearance) between the attraction position and initial position.

Based on such knowledge, the valve seat member 20 of the fluid control electromagnetic valve 1 is set to have a smaller linear expansion coefficient than the resin housing 11 and the resin cover 12 which constitute the resin body 10. As a result, thermal expansion of the member 20 can be limited. The fourth accommodating portion 200 of the valve seat member 20 is clamped between the first sealing member 80, which is positioned at the neighboring part of the plate core 32 of the fixed core 30 to seal the fluid passage 2, and the second sealing member 90, which is provided to seal this fluid passage 2. Consequently, the valve seat member 20 can be properly positioned relative to the metal fixed core 30 including the plate core 32 via the first sealing member 80.

In the case of the valve seat member 20, the elastic restoring force that is applied to this fourth accommodating portion 200 by the second sealing member 90 in an elastic compression state is larger than the elastic restoring force that is applied to the fourth accommodating portion 200 by the first sealing member 80 in an elastic compression state. Accordingly, the fourth accommodating portion 200 is pressed on the first sealing member 80 in accordance with a difference between the elastic restoring forces applied by the sealing members 80, 90. Therefore, the function of positioning the valve seat member 20 relative to the fixed core 30 does not easily vary.

For these reasons, as for the valve seat member 20 thermal expansion of which is restrained and which is positioned relative to the fixed core 30, a relative position of the fixed valve seat 200*a* of the member 20 with respect to the fixed core 30 can be stabilized. Accordingly, even if the resin body 10 having a high linear expansion coefficient is thermally-expanded, a fluctuation of a flow rate of the fuel-air mixture which is made to flow through a clearance between the element 40 and the fixed valve seat 200*a* in the valve passage 2*d* by the movable valving element 40 at the attraction position with the separation distance between the attraction position and the initial position maintained can be limited. Thus, it is possible to ensure accuracy in control of the flow of the fuel-air mixture in the fluid passage 2 including the valve passage 2*d*.

In addition, when the resin body 10 is formed in a process of production of the fluid control electromagnetic valve 1, the resin cover 12 is inserted into the resin housing 11 in which the components 20, 30, 40, 50, 60, 70, 80, 90 are accommodated, and the housing 11 and the cover 12 are joined together by laser-welding. Consequently, at the same time as the formation of the resin body 10, the second sealing member 90, which is formed from the same material as the first sealing member 80 and which is more thick-walled in its axial direction than the first sealing member 80, is clamped between the valve seat member 20 and the resin cover 12, and the member 90 can thereby be elastically compressed reliably. As a result, an improvement in productivity of the valve 1 is made, and the generation of the elastic restoring force which is larger than the first sealing member 80 is consolidated by the second sealing member 90. Therefore, reliability in the effect of securing the accuracy in flow control can be improved.

(Second Embodiment)

Figure 6:
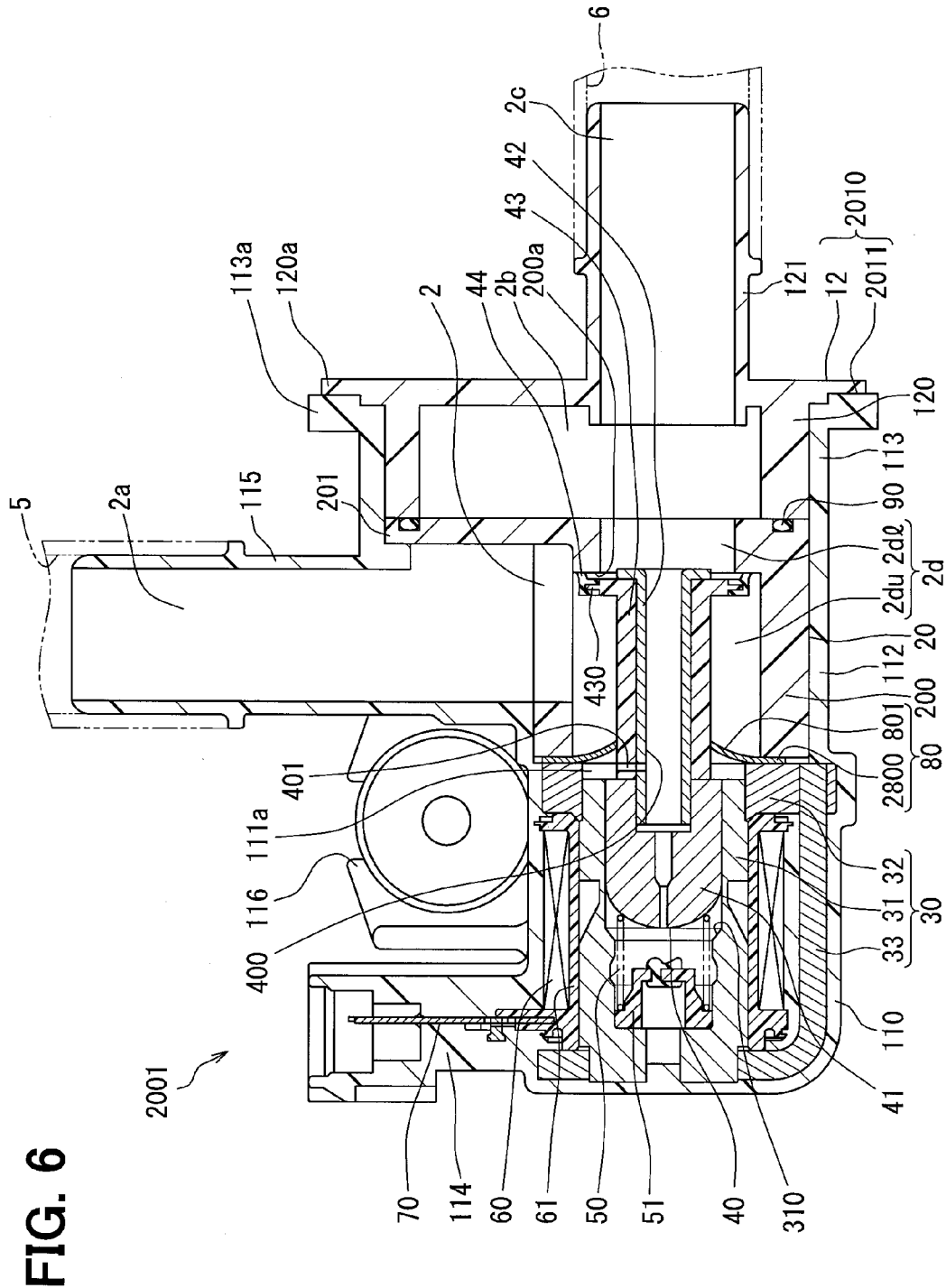
FIG. 6 is a sectional view illustrating a fluid control electromagnetic valve in accordance with a second embodiment and corresponding to FIG. 2.

As illustrated in FIG. 6, a second embodiment is a modification to the first embodiment. In a fluid control electromagnetic valve 2001 of the second embodiment, a resin housing 2011 of a resin body 2010 does not include a second accommodating portion 111. Accordingly, an outer circumferential sealing portion 2800 of a first sealing member 80 is clamped between a plate core 32 and a fourth accommodating portion 200 in the axial direction, so that the portion 2800 is stably positioned around the plate core 32. Hence, a valve seat member 20 can be stably positioned via the first sealing member 80 relative to a metal fixed core 30 including the plate core 32.

Moreover, in the fluid control electromagnetic valve 2001, elastic restoring force applied to the fourth accommodating portion 200 by a second sealing member 90 is larger than elastic restoring force applied to this fourth accommodating portion 200 by the first sealing member 80 due to its elastic compression between the plate core 32 and the fourth accommodating portion 200. Consequently, operation of positioning the valve seat member 20 relative to the fixed core 30 does not easily vary on the same principle as the first embodiment.

A linear expansion coefficient of the valve seat member 20 of the second embodiment is also set to be smaller than the resin housing 2011 and a resin cover 12 which constitute the resin body 2010, and thermal expansion of the member 20 can thereby be limited. As a result, as described above, a relative position of a fixed valve seat 200*a* of the valve seat member 20 with respect to the fixed core 30 can be made stable. Therefore, a flow rate change, which deteriorates the accuracy in control of the flow of the fuel-air mixture, can be curbed through a clearance between the valve seat 200*a* and a movable valving element 40 in a valve passage 2*d*.

(Third Embodiment)

Figure 7:
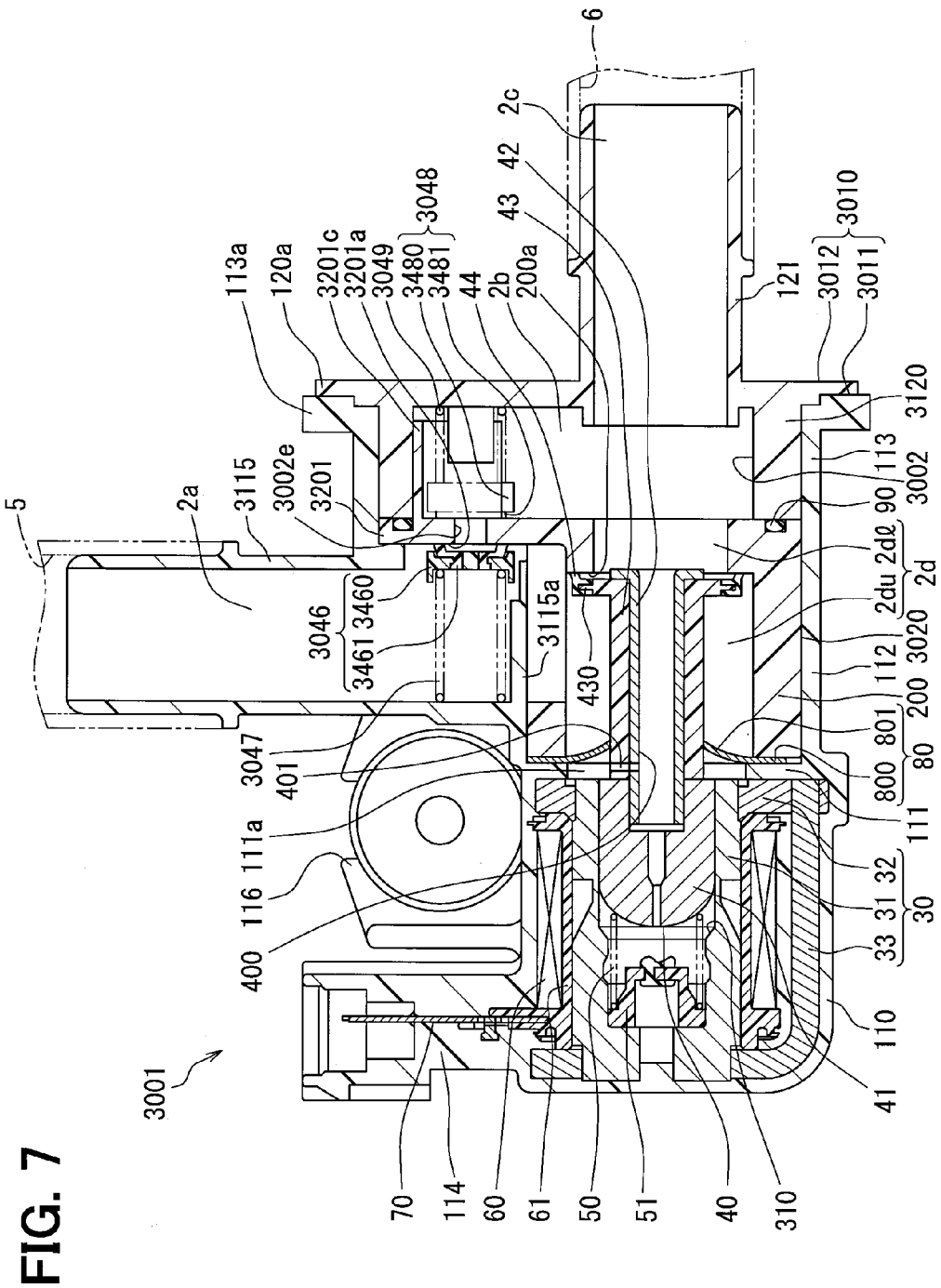
FIG. 7 is a sectional view illustrating a fluid control electromagnetic valve in accordance with a third embodiment and corresponding to FIG. 2.
Figure 8:
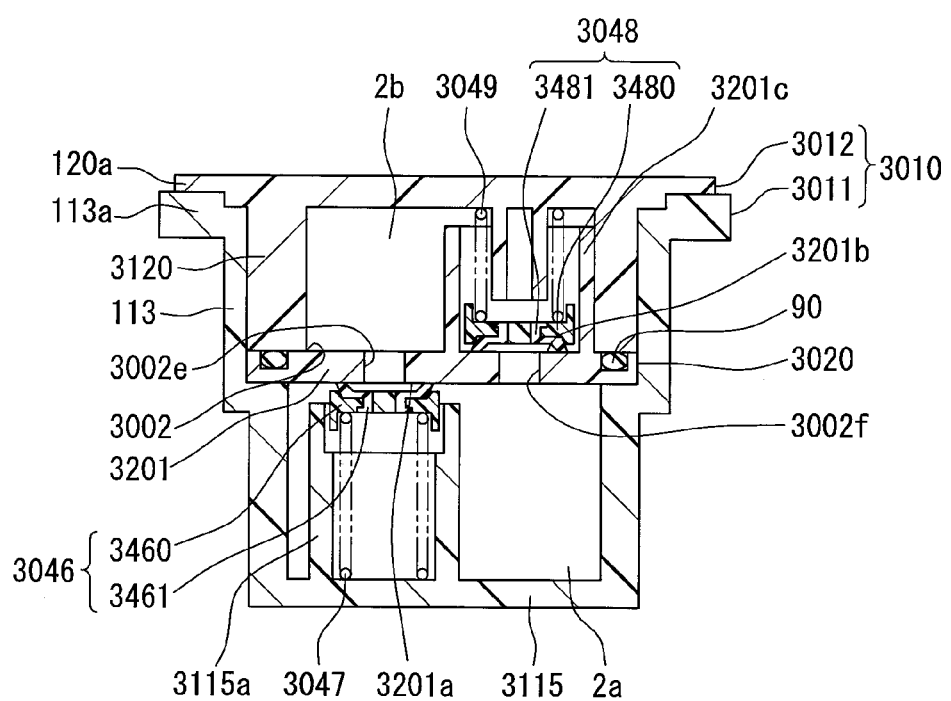
FIG. 8 is a cross-sectional view illustrating the fluid control electromagnetic valve of the third embodiment and corresponding to FIG. 4.

As illustrated in FIGS. 7 and 8, a third embodiment is a modification to the first embodiment. In a fluid control electromagnetic valve 3001 of the third embodiment, a negative pressure relief passage 3002*e* and a positive pressure relief passage 3002*f* are provided for a partition portion 3201 of a valve seat member 3020 as a part of a fluid passage 3002. The relief passages 3002*e*, 3002*f* pass through the partition portion 3201 at positions of the partition portion 3201 which are away from each other, in the shapes of cylindrical holes. Accordingly, the passages 3002*e*, 3002*f* can communicate with an input passage 2*a* and a communication passage 2*b* of the fluid passage 3002.

In the fluid control electromagnetic valve 3001, a negative pressure relief valving element 3046 and a negative pressure relief spring 3047 are accommodated in a movable state in the input passage 2*a* inside an input port portion 3115 of a resin housing 3011 which constitutes a resin body 3010. The negative pressure relief valving element 3046 is obtained as a result of holding an annular rubber buffer member 3461 by a resin valve member 3460 having a shape of a circular disk, and is disposed coaxially with the negative pressure relief passage 3002*e*. By such an arrangement mode, in the case of the negative pressure relief valving element 3046, the buffer member 3461 can be engaged with or disengaged from a negative pressure valve seat 3201*a*, which is formed on the partition portion 3201 around the negative pressure relief passage 3002*e*.

The negative pressure relief spring 3047, which is a metal compression coil spring, is disposed inside a partially-cylindrical negative pressure valve guide 3115*a* formed integrally with the input port portion 3115 coaxially with the guide 3115*a*. One end part of the negative pressure relief spring 3047 in its axial direction is engaged with the input port portion 3115, and the other end part of the negative pressure relief spring 3047 in its axial direction is in contact with the valve member 3460. As a result of such a mode of its engagement and contact, the negative pressure relief spring 3047 urges the negative pressure relief valving element 3046 toward the negative pressure valve seat 3201*a*.

Because of such a collaboration between the negative pressure relief valving element 3046 and the negative pressure relief spring 3047, in the fluid control electromagnetic valve 3001, the negative pressure relief valving element 3046 is opened in accordance with internal pressure of a fuel tank 3 in a valve-closing state of a movable valving element 40. Specifically, when the internal pressure of the fuel tank 3 falls below a negative pressure side limit pressure, which is lower than the atmospheric pressure by a predetermined amount, due to, for example, temperature decrease, the negative pressure relief valving element 3046 is disengaged from the negative pressure valve seat 3201a against the urging operation of the negative pressure relief spring 3047, which leads to a valve-opening state in which the passages 2b, 2a communicate with each other. In such a valve-opening state, air in a canister 4 is drawn into the fuel tank 3 through the passages 2b, 2a, so that the internal pressure of the fuel tank 3 increases. Thus, deformation of the fuel tank 3 due to the application of negative pressure to the tank 3 can be avoided. When the internal pressure of the fuel tank 3 rises above the negative pressure side limit pressure, the negative pressure relief valving element 3046 is engaged with the negative pressure valve seat 3201a by the urging operation of the negative pressure relief spring 3047. Accordingly, the communication between the passages 2b, 2a is blocked.

In the fluid control electromagnetic valve 3001, a positive pressure relief valving element 3048 and a positive pressure relief spring 3049 are accommodated in a movable state in the communication passage 2b inside an insertion portion 3120 of a resin cover 3012 which constitutes the resin body 3010. The positive pressure relief valving element 3048 is obtained as a result of holding an annular rubber buffer member 3481 by a resin valve member 3480 having a shape of a circular disk, and is disposed coaxially with the positive pressure relief passage 3002f. By such an arrangement mode, in the case of the positive pressure relief valving element 3048, the buffer member 3481 can be engaged with or disengaged from a positive pressure valve seat 3201b, which is formed on the partition portion 3201 around the positive pressure relief passage 3002f.

The positive pressure relief spring 3049, which is a metal compression coil spring, is disposed inside a partially-cylindrical positive pressure valve guide 3201c formed integrally with the partition portion 3201 coaxially with the guide 3201c. One end part of the positive pressure relief spring 3049 in its axial direction is engaged with the insertion portion 3120, and the other end part of the positive pressure relief spring 3049 in its axial direction is in contact with the valve member 3480. As a result of such a mode of its engagement and contact, the positive pressure relief spring 3049 urges the positive pressure relief valving element 3048 toward the positive pressure valve seat 3201b.

Because of such a collaboration between the positive pressure relief valving element 3048 and the positive pressure relief spring 3049, in the fluid control electromagnetic valve 3001, the positive pressure relief valving element 3048 is opened in accordance with internal pressure of the fuel tank 3 in a valve-closing state of the movable valving element 40. Specifically, when the internal pressure of the fuel tank 3 rises above a positive pressure side limit pressure, which is higher than the atmospheric pressure by a predetermined amount, due to, for example, temperature increase, the positive pressure relief valving element 3048 is disengaged from the positive pressure valve seat 3201b against the urging operation of the positive pressure relief spring 3049, which leads to a valve-opening state in which the passages 2a, 2b communicate with each other. In such a valve-opening state, the fuel-air mixture in the fuel tank 3 is pushed out into the canister 4 through the passages 2a, 2b, so that the pressure in the fuel tank 3 is decreased. Thus, deformation of the fuel tank 3 due to the application of high positive pressure to the tank 3 can be avoided. When the internal pressure of the fuel tank 3 falls below the positive pressure side limit pressure, the positive pressure relief valving element 3048 is engaged with the positive pressure valve seat 3201b by the urging operation of the positive pressure relief spring 3049. Accordingly, the communication between the passages 2a, 2b is blocked.

Except for the above-described points, in the fluid control electromagnetic valve 3001, substantially the same configuration as the first embodiment is employed. Thus, securing of the accuracy in control of the flow of the fuel-air mixture through the fluid passage 3002, and improvement of reliability in this securing effect become possible along with the avoidance of deformation of the fuel tank 3.

(Fourth Embodiment)

Figure 9:
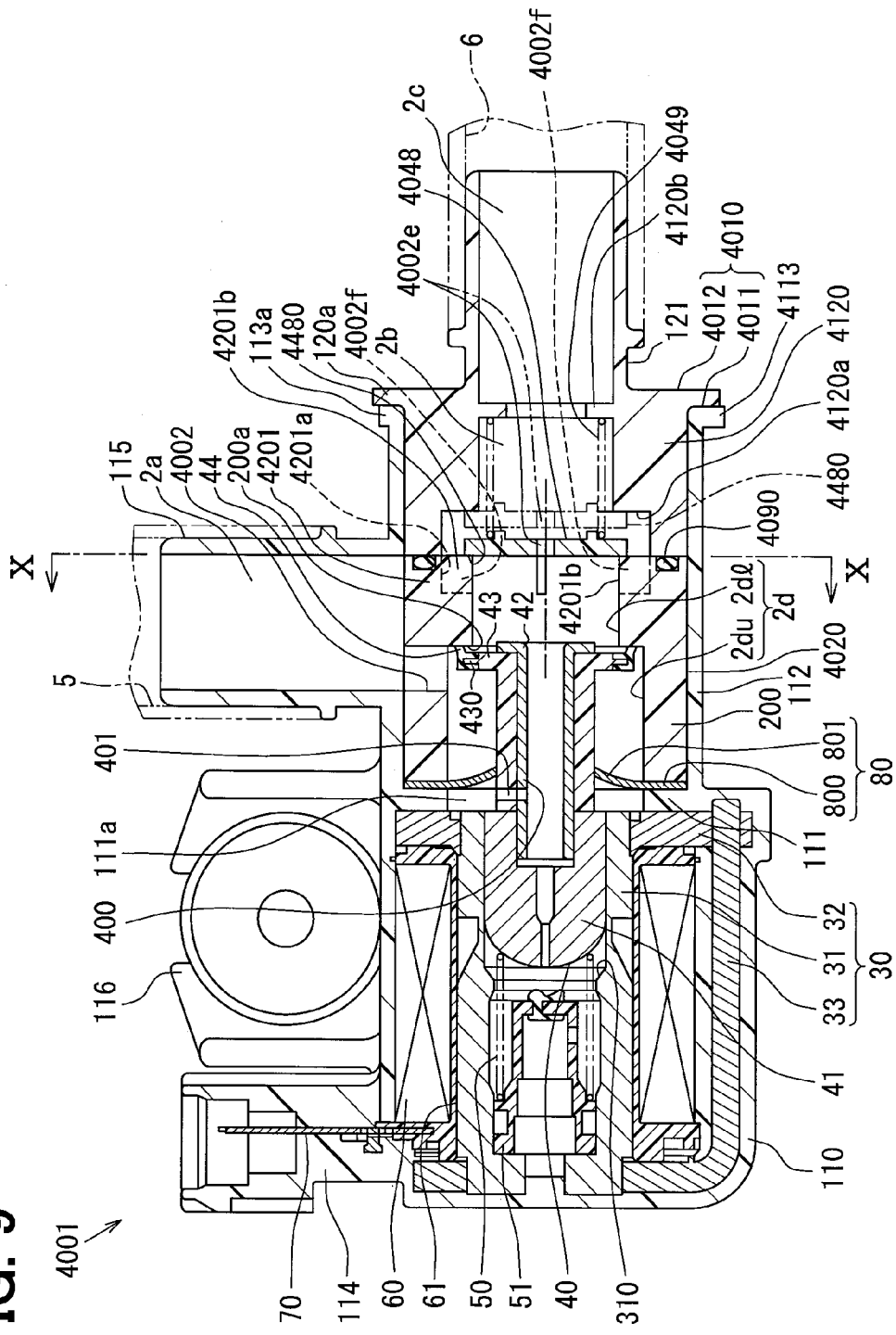
FIG. 9 is a sectional view illustrating a fluid control electromagnetic valve in accordance with a fourth embodiment and corresponding to FIG. 2 as a sectional view taken along a line IX-IX in FIG. 10.
Figure 10:
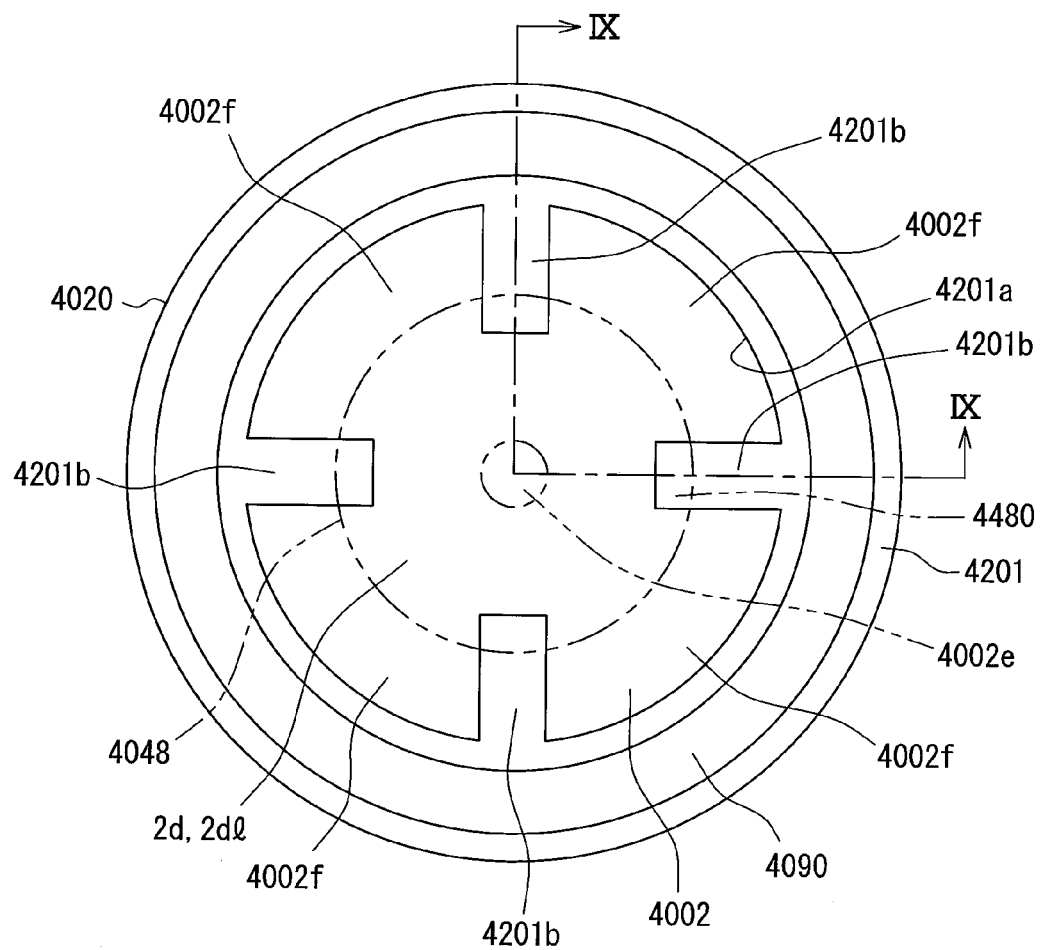
FIG. 10 is a cross-sectional view taken along a line X-X in FIG. 9 illustrating the fluid control electromagnetic valve of the fourth embodiment.

As illustrated in FIGS. 9 and 10, a fourth embodiment is a modification to the first embodiment. In a fluid control electromagnetic valve 4001 of the fourth embodiment, a partition portion 4201 of a valve seat member 4020 includes a partition main body 4201a and a projecting valve seat 4201b. The partition main body 4201a is formed in a cylindrical shape that projects from a fourth accommodating portion 200 on the opposite side from a second accommodating portion 111 in the axial direction coaxially with them. The partition main body 4201a is disposed in a passage portion 2dl of a valve passage 2d on a communication passage 2b-side of a fixed valve seat 200a, and divides this passage portion 2dl from an input passage 2a and the communication passage 2b. The projecting valve seats 4201b project radially inward from more than one position of the partition main body 4201a at regular intervals in the circumferential direction.

As illustrated in FIG. 9, in the fluid control electromagnetic valve 4001, an insertion portion 4120 of a resin cover 4012 which constitutes a resin body 4010 is formed in a cylindrical shape that is coaxial with the partition main body 4201a together with a joining portion 4113 of a resin housing 4011 which constitutes the resin body 4010. A second sealing member 4090, which is clamped between these insertion portion 4120 and partition main body 4201a, is formed from rubber into an annular shape (see also FIG. 10) extending with an elliptical cross-section, and the entire sealing member 4090 in the circumferential direction is opposed to its coaxial first sealing member 80. As a result of such an opposing mode, the annular second sealing member 4090 produces elastic restoring force which is larger than its coaxial annular first sealing member 80 in the entire circumferential direction so as to reduce variation in pressing pressure of the fourth accommodating portion 200 against the first sealing member 80 in the circumferential direction.

In the fluid control electromagnetic valve 4001, a flow regulating valving element 4048 and a flow regulating spring 4049 are accommodated in a movable state in the communication passage 2b inside the insertion portion 4120. The flow regulating valving element 4048 is formed from resin in a shape of an annular plate, and is disposed coaxially with the partition main body 4201a. As a result of such an arrangement mode, with regard to the flow regulating valving element 4048, an outer circumferential portion 4480 having a smaller diameter than the partition main body 4201a can be engaged with or disengaged from the respective projecting valve seats 4201b. As well, regarding the flow regulating valving element 4048, the outer circumferential portion 4480 can be engaged with or disengaged from a flow regulating valve seat 4120a in a shape of an annular belt surface formed at an inner peripheral part of the insertion portion 4120.

As illustrated in FIGS. 9 and 10, the flow regulating valving element 4048 includes a penetration passage 4002e passing through the element 4048 in the axial direction as a part of a fluid passage 4002. In a state of engagement of the flow regulating valving element 4048 with the projecting valve seats 4201b, clearance passages 4002f as a part of the fluid passage 4002 are formed between the flow regulating valving element 4048 and the partition main body 4201a. A sum of passage areas of the respective clearance passages 4002f is set to be sufficiently larger than a passage area of the penetration passage 4002e.

As illustrated in FIG. 9, the flow regulating spring 4049, which is a metal compression coil spring, is disposed in the communication passage 2b inside the insertion portion 4120 coaxially with the passage 2b. One end part of the flow regulating spring 4049 in its axial direction is engaged with an annular plate-like locking piece 4120b which is formed integrally with the insertion portion 4120, and the other end part of the flow regulating spring 4049 in its axial direction is in contact with the flow regulating valving element 4048. As a result of such a mode of its engagement and contact, the flow regulating spring 4049 urges the flow regulating valving element 4048 toward the respective projecting valve seats 4201b.

Because of such a collaboration between the flow regulating valving element 4048 and the flow regulating spring 4049, in the fluid control electromagnetic valve 4001, the flow regulating valving element 4048 is opened in accordance with internal pressure of a fuel tank 3 in a valve-opening state of a movable valving element 40. Specifically, during the oil supply in which the movable valving element 40 is opened, when the internal pressure of the fuel tank 3 becomes higher than a set pressure, the flow regulating valving element 4048 which is disengaged from the respective projecting valve seats 4201b against the urging operation of the flow regulating spring 4049 is engaged with the flow regulating valve seat 4120a. As a result, the passage portion 2dl of the valve passage 2d communicates with the communication passage 2b through the penetration passage 4002e having a small passage area. Consequently, a flow rate of the fuel-air mixture that is pushed out from the inside of the fuel tank 3 through the passages 2a, 2d, 4002e, 2b, 2c into a canister 4 is reduced. Hence, a leakage of fuel vapor that is no longer adsorbed due to the amount of fuel vapor in the fuel-air mixture which reaches the inside of the canister 4 being beyond adsorption capability of an adsorbent 4a can be avoided.

On the other hand, during the oil supply in which the movable valving element 40 is opened, when the internal pressure of the fuel tank 3 becomes lower than the set pressure, the flow regulating valving element 4048, which is disengaged from the flow regulating valve seat 4120a by the urging operation of the flow regulating spring 4049, is engaged with the respective projecting valve seats 4201b. As a result, the passage portion 2dl of the valve passage 2d communicates with the communication passage 2b via the respective clearance passages 4002f with their large total passage area. Accordingly, the flow rate of the fuel-air mixture that is pushed out from the inside of the fuel tank 3 through the passages 2a, 2d, 4002f, 2b, 2c into the canister 4 increases. Thus, even if the internal pressure of the fuel tank 3 is low, the fuel-air mixture is reliably released, and the leakage of fuel vapor from the tank 3 can thereby be avoided.

Except for the above-described points, in the fluid control electromagnetic valve 4001, substantially the same configuration as the first embodiment is employed. Accordingly, securing of the accuracy in control of the flow of the fuel-air mixture through the fluid passage 4002, and further improvement of reliability in this securing effect as a result of the reduction of variation in the pressing pressure of the fourth accommodating portion 200 against the first sealing member 80 become possible along with avoidance of the leakage of fuel vapor.

Modifications to the above embodiments will be described. The embodiments have been described above. Nevertheless, the disclosure is not interpreted by limiting itself to these embodiments, and may be applied to various embodiments and combinations without departing from the scope of the disclosure.

Specifically, in the first to fourth embodiments, the linear expansion coefficients of the resin housings 11, 2011, 3011, 4011 and the resin covers 12, 3012, 4012, which respectively constitute the resin bodies 10, 2010, 3010, 4010, may be different from each other as long as they are larger than the valve seat members 20, 3020, 4020. In this case, for example, by forming the resin housings 11, 2011, 3011, 4011 and the resin covers 12, 3012, 4012 from different materials which have laser absorptivity and whose melting points are close to each other, they can be joined together through laser-welding similar to the cases of the first to fourth embodiments. Moreover, the valve seat members 20, 3020, 4020 of the first to fourth embodiments may be formed from materials other than resin, for example, metal, as long as their linear expansion coefficients are smaller than the resin housings 11, 2011, 3011, 4011 and the resin covers 12, 3012, 4012.

Figure 11:
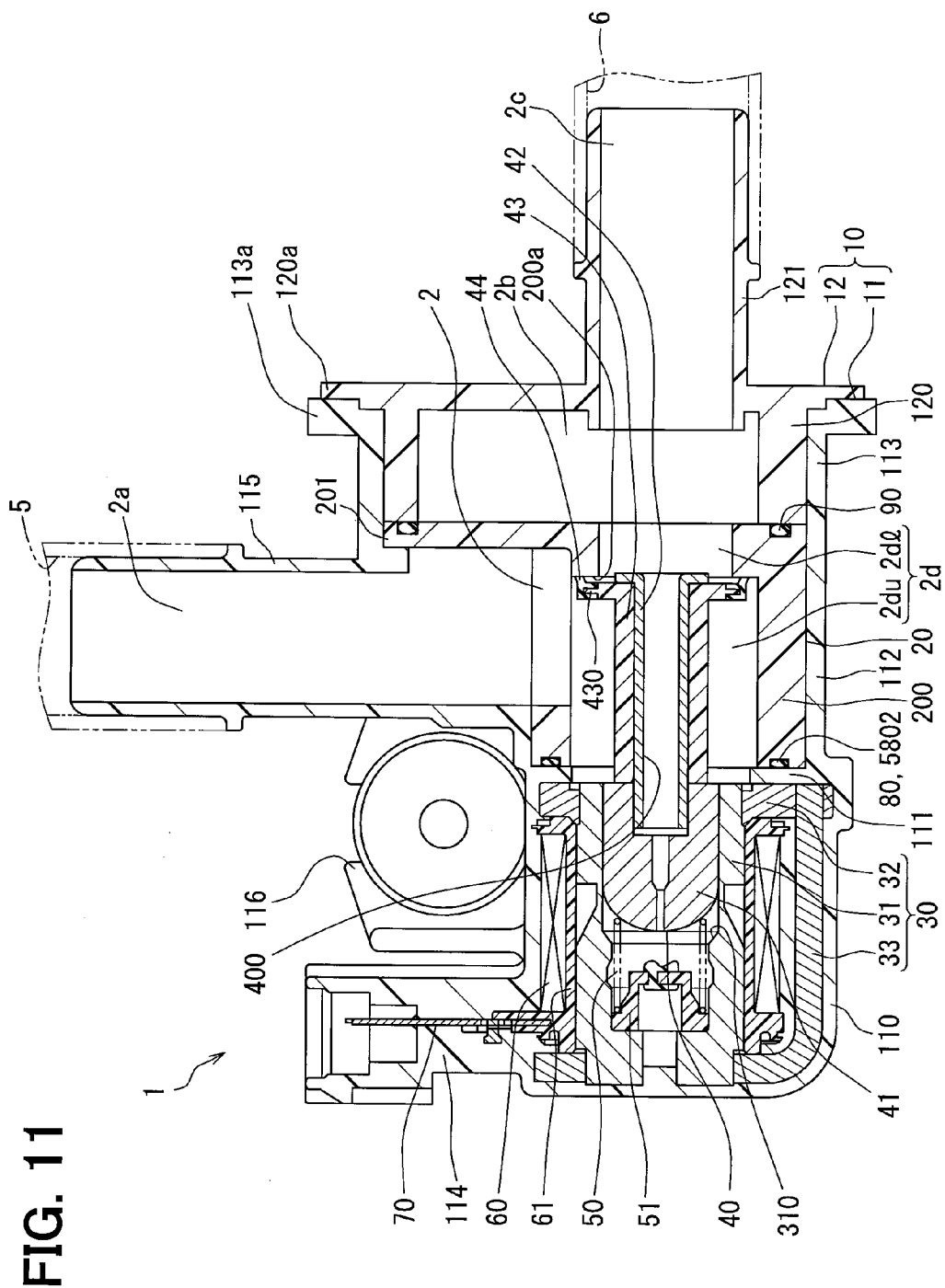
FIG. 11 is a sectional view illustrating a modification to the fluid control electromagnetic valve of FIG. 2.

The sealing members 80, 90, 4090 of the first to fourth embodiments may be formed from rubbers which are different from each other, or may be formed to have axial thicknesses which are the same as each other. Furthermore, as illustrated in a modification (FIG. 11 is a modification to the first embodiment) of FIG. 11, the first sealing member 80 of the first to fourth embodiments may consist only of a ring body 5802 that is clamped between the second accommodating portion 111 or the plate core 32 and the fourth accommodating portion 200, so that the first sealing member 80 has a configuration that does not fulfill the function as the diaphragm portion 801.

The first sealing member 80 of the third and fourth embodiments may be clamped between the plate core 32 of the fixed core 30 and the fourth accommodating portion 200 of the valve seat members 20, 3020, 4020 according as the second embodiment. Also, the entire second sealing member 90 of the first to third embodiments in its circumferential direction may be opposed to its coaxial first sealing member 80 according as the fourth embodiment. In addition, a part of the second sealing member 4090 of the fourth embodiment in its circumferential direction may be axially opposed to the first sealing member 80 according as the first to third embodiments.

The present disclosure can be applied to fluid control electromagnetic valves that control flows of various fluids, other than the fluid control electromagnetic valves 1, 2001, 3001, 4001 that control a flow of the mixture of fuel vapor and air in the system which processes fuel vapor.

To sum up, the fluid control electromagnetic valve 1, 2001, 3001, 4001 of the above embodiments can be described as follows.

A fluid control electromagnetic valve 1, 2001, 3001, 4001 for controlling a flow of fluid, includes a fixed core 30, a movable valving element 40, a resin body 10, 2010, 3010, 4010, a valve seat member 20, 3020, 4020, a first sealing member 80, 5802, and a second sealing member 90, 4090. The fixed core 30 is formed from metal and is configured to generate electromagnetic attraction force. The movable valving element 40 includes a movable core 41 formed from metal. The movable valving element 40 is attracted from an initial position to an attraction position as a result of application of the electromagnetic attraction force to the movable core 41 and is returned from the attraction position to the initial position as a result of disappearance of the electromagnetic attraction force, so that the movable valving element 40 reciprocates in its axial direction between the initial position and the attraction position. The resin body 10, 2010, 3010, 4010 accommodates therein the fixed core 30 and the movable valving element 40 and includes therein a fluid passage 2, 3002, 4002 through which fluid flows. The valve seat member 20, 3020, 4020 is formed from a material having a smaller linear expansion coefficient than the resin body 10, 2010, 3010, 4010 and is accommodated in the resin body 10, 2010, 3010, 4010. The valve seat member 20, 3020, 4020 includes a fixed valve seat 200a, and the movable valving element 40 is engaged with or disengaged from the fixed valve seat 200a. The fluid passage 2, 3002, 4002 is opened as a result of the disengagement of the movable valving element 40 at the attraction position from the fixed valve seat 200a and the fluid passage 2, 3002, 4002 is closed as a result of the engagement of the movable valving element 40 at the initial position with the fixed valve seat 200a. The first sealing member 80, 5802 is accommodated in the resin body 10, 2010, 3010, 4010 in an elastic compression state to seal the fluid passage 2, 3002, 4002 and is positioned around the fixed core 30. The second sealing member 90, 4090 is accommodated in the resin body 10, 2010, 3010, 4010 in an elastic compression state to seal the fluid passage 2, 3002, 4002. The valve seat member 20, 3020, 4020 is clamped between the second sealing member 90, 4090 and the first sealing member 80, 5802 in the axial direction. Elastic restoring force applied by the second sealing member 90, 4090 to the valve seat member 20, 3020, 4020 is larger than elastic restoring force applied by the first sealing member 80, 5802 to the valve seat member 20, 3020, 4020.

The movable valving element 40, which reciprocates in the axial direction between the initial position and the attraction position inside the resin body 10, 2010, 3010, 4010, is attracted from the initial position to the attraction position due to the generation of electromagnetic attraction force applied by the fixed core 30 to the movable core 41 of the element 40. Accordingly, the element 40 is disengaged from the fixed valve seat 200a of the valve seat member 20, 3020, 4020 so as to open the fluid passage 2, 3002, 4002. On the other hand, the movable valving element 40 returns from the attraction position to the initial position due to the disappearance of electromagnetic attraction force to be engaged with the fixed valve seat 200a. Consequently, the element 40 closes the fluid passage 2, 3002, 4002. The attraction position among movement positions of the movable valving element 40 is determined depending on a position of the metal fixed core 30, which attracts the metal movable core 41, whereas the initial position of the movable valving element 40 is determined according to a position of the fixed valve seat 200a with which the movable valving element 40 is engaged. Therefore, in order to secure accuracy in control of a flow of fluid in the fluid passage 2, 3002, 4002 through the opening and closing of the fluid passage 2, 3002, 4002 by use of the electromagnetic drive of the movable valving element 40, it is important to make stable the relative position of the fixed valve seat 200a with regard to the fixed core 30 to keep constant the separation distance between the attraction position and the initial position.

Based on such a finding, a linear expansion coefficient of the valve seat member 20, 3020, 4020 is made smaller than the resin body 10, 2010, 3010, 4010. Accordingly, thermal expansion of the valve seat member 20, 3020, 4020 can be limited. The valve seat member 20, 3020, 4020 is clamped axially between the first sealing member 80, 5802 which is positioned around the fixed core 30 for sealing the fluid passage 2, 3002, 4002, and the second sealing member 90, 4090 for this sealing purpose. As a result, the valve seat member 20, 3020, 4020 can be positioned relative to the fixed core 30 via this first sealing member 80, 5802. Moreover, the elastic restoring force, which is larger than the force applied by the first sealing member 80, 5802 in an elastic compression state, is applied by the second sealing member 90, 4090 in an elastic compression state to the valve seat member 20, 3020, 4020. The valve seat member 20, 3020, 4020 is thereby pressed on the first sealing member 80, 5802. Consequently, a variation in the operation of positioning the valve seat member 20, 3020, 4020 relative to the fixed core 30 is not easily made.

For these reasons, as for the valve seat member 20, 3020, 4020 thermal expansion of which is restrained and which is positioned relative to the fixed core 30, a relative position of the fixed valve seat 200a with respect to the fixed core 30 can be stabilized. Thus, even if the resin body 10, 2010, 3010, 4010 having a high linear expansion coefficient is thermally-expanded, the fluctuation of a flow rate of fluid flowing through a clearance between the movable valving element 40 and the fixed valve seat 200a at the attraction position can be curbed with the separation distance between the attraction position and the initial position being maintained. Accordingly, accuracy in control of a flow of fluid in the fluid passage 2, 3002, 4002 can be ensured.

The first sealing member 80 and the second sealing member 4090 may be annularly formed coaxially with each other inside the resin body 4010.

The annular second sealing member 4090 generates the elastic restoring force which is larger than its coaxial annular first sealing member 80 in the entire circumferential direction. Consequently, a circumferential variation of the pressing pressure of the valve seat member 4020 against the first sealing member 80 can be reduced. As a result, the operation of positioning the valve seat member 4020 relative to the fixed core 30 can be enhanced so as to stabilize a relative position of the fixed valve seat 200a of the valve seat member 4020 with respect to the fixed core 30. Therefore, reliability in the effect of securing the accuracy in control of fluid circulation by limiting the fluctuation of a flow rate of fluid through a clearance between the fixed valve seat 200a and the movable valving element 40 is improved.

The resin body 10, 2010, 3010, 4010 may include: a resin housing 11, 2011, 3011, 4011 that is formed from resin and accommodates therein the valve seat member 20, 3020, 4020 and the first and second sealing members 80, 5802; 90, 4090 along with the fixed core 30 and the movable valving element 40; and a resin cover 12, 3012, 4012 that is formed from resin and is joined to the resin housing 11, 2011, 3011, 4011. The second sealing member 90, 4090 may be clamped between the resin cover 12, 3012, 4012 and the valve seat member 20, 3020, 4020.

At the time of formation of the resin body 10, 2010, 3010, 4010, the resin cover 12, 3012, 4012 is joined to the resin housing 11, 2011, 3011, 4011 in which the valve seat member 20, 3020, 4020 and the sealing members 80, 5802, 90, 4090 together with the fixed core 30 and the movable valving element 40 are accommodated. Accordingly, the second sealing member 90, 4090 of these sealing members 80, 5802, 90, 4090 can be easily clamped between the resin cover 12, 3012, 4012 and the valve seat member 20, 3020, 4020. As a result of such a clamping mode, the elastic restoring force, which is larger than the first sealing member 80, 5802, can be produced by properly elastically-compressing the second sealing member 90, 4090 between the resin cover 12, 3012, 4012 and the valve seat member 20, 3020, 4020. Hence, the operation of positioning the valve seat member 20, 3020, 4020 relative to the fixed core 30 reliably does not vary easily. As a consequence, a relative position of the fixed valve seat 200a of the valve seat member 20, 3020, 4020 with respect to the fixed core 30 is stabilized. Therefore, reliability in the effect of securing the accuracy in control of fluid circulation by limiting the fluctuation of a flow rate of fluid through a clearance between the fixed valve seat 200a and the movable valving element 40 is improved.

The first sealing member 80, 5802 may be clamped between the resin body 10, 3010, 4010 and the valve seat member 20, 3020, 4020 around the fixed core 30.

By clamping the first sealing member 80, 5802 between the resin body 10, 3010, 4010 and the valve seat member 20, 3020, 4020 in the periphery of the fixed core 30, not only the positioning of the first sealing member 80, 5802 relative to the fixed core 30 but also the positioning of the valve seat member 20, 3020, 4020 relative to the fixed core 30 can be properly achieved via the first sealing member 80, 5802. Accordingly, a relative position of the fixed valve seat 200a of the valve seat member 20, 3020, 4020, which is positioned relative to the fixed core 30, with respect to the fixed core 30 is stabilized. Therefore, a flow rate change, which deteriorates the accuracy in control of the fluid circulation, can be curbed through a clearance between the fixed valve seat 200a and the movable valving element 40.

The first sealing member 80 may be clamped between the fixed core 30 and the valve seat member 20.

By clamping the first sealing member 80 between the fixed core 30 and the valve seat member 20, the positioning of the valve seat member 20 relative to the fixed core 30 as well as the positioning of the first sealing member 80 relative to the fixed core 30 can be stably achieved via the first sealing member 80. Accordingly, a relative position of the fixed valve seat 200a of the valve seat member 20, which is positioned relative to the fixed core 30, with respect to the fixed core 30 is stabilized. Therefore, a flow rate change, which deteriorates the accuracy in control of the fluid circulation, can be reliably curbed through a clearance between the fixed valve seat 200a and the movable valving element 40.

The fluid control electromagnetic valve 1, 2001, 3001, 4001 may be adapted to be connected between a fuel tank 3 that stores fuel and a canister 4 that adsorbs fuel vapor which is produced by evaporation of fuel in the fuel tank 3. The fluid passage 2, 3002, 4002 may include: a passage portion 2du that is located on an upstream side of the fixed valve seat 200a in a flow direction of fluid and is connected to the fuel tank 3; and a passage portion 2dl that is located on a downstream side of the fixed valve seat 200a in the flow direction of fluid and is connected to the canister 4. The fluid may include a mixture of fuel vapor and air. The fluid control electromagnetic valve 1, 2001, 3001, 4001 may control a flow of the mixture from the fuel tank 3 toward the canister 4.

The passage portions 2du, 2dl of the fluid passage 2, 3002, 4002 on upstream and downstream sides of the fixed valve seat 200a are connected to the fuel tank 3 which stores fuel, and the canister 4 which adsorbs fuel vapor produced by the evaporation of fuel in the tank 3. Accordingly, a flow of the mixture of fuel vapor and air from the fuel tank 3 toward the canister 4 can be controlled. Because the relative position of the fixed valve seat 200a of the valve seat member 20, 3020, 4020 with respect to the fixed core 30 can be stabilized as described above, the accuracy in control of circulation of the fuel-air mixture can be ensured.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A fluid control electromagnetic valve for controlling a flow of fluid, comprising:
    a fixed core that is formed from metal and is configured to generate electromagnetic attraction force;
    a movable valving element that includes a movable core formed from metal, wherein the movable valving element is attracted from an initial position to an attraction position as a result of application of the electromagnetic attraction force to the movable core and is returned from the attraction position to the initial position as a result of disappearance of the electromagnetic attraction force, so that the movable valving element reciprocates in its axial direction between the initial position and the attraction position;
    a resin body that accommodates therein the fixed core and the movable valving element and includes therein a fluid passage through which fluid flows;
    a valve seat member that is formed from a material having a smaller linear expansion coefficient than the resin body and is accommodated in the resin body, wherein:
        the valve seat member includes a fixed valve seat, and the movable valving element is engaged with or disengaged from the fixed valve seat; and
        the fluid passage is opened as a result of the disengagement of the movable valving element at the attraction position from the fixed valve seat and the fluid passage is closed as a result of the engagement of the movable valving element at the initial position with the fixed valve seat;
    a first sealing member that is accommodated in the resin body in an elastic compression state to seal the fluid passage and is positioned around the fixed core; and
    a second sealing member that is accommodated in the resin body in an elastic compression state to seal the fluid passage, wherein:
        the valve seat member is clamped between the second sealing member and the first sealing member in the axial direction; and
        elastic restoring force applied by the second sealing member to the valve seat member is larger than elastic restoring force applied by the first sealing member to the valve seat member.

2. The fluid control electromagnetic valve according to claim 1, wherein the first sealing member and the second sealing member are annularly formed coaxially with each other inside the resin body.

3. The fluid control electromagnetic valve according to claim 1, wherein the resin body includes:
    a resin housing that is formed from resin and accommodates therein the valve seat member and the first and second sealing members along with the fixed core and the movable valving element; and
    a resin cover that is formed from resin and is joined to the resin housing, wherein the second sealing member is clamped between the resin cover and the valve seat member.

4. The fluid control electromagnetic valve according to claim 1, wherein the first sealing member is clamped between the resin body and the valve seat member around the fixed core.

5. The fluid control electromagnetic valve according to claim 1, wherein the first sealing member is clamped between the fixed core and the valve seat member.

6. The fluid control electromagnetic valve according to claim 1, wherein:
- the fluid control electromagnetic valve is adapted to be connected between a fuel tank that stores fuel and a canister that adsorbs fuel vapor which is produced by evaporation of fuel in the fuel tank;
- the fluid passage includes:
  - a passage portion that is located on an upstream side of the fixed valve seat in a flow direction of fluid and is connected to the fuel tank; and
  - a passage portion that is located on a downstream side of the fixed valve seat in the flow direction of fluid and is connected to the canister;
- the fluid includes a mixture of fuel vapor and air; and
- the fluid control electromagnetic valve controls a flow of the mixture from the fuel tank toward the canister.

\* \* \* \* \*